US009559886B2

(12) United States Patent
Xiao

(10) Patent No.: US 9,559,886 B2
(45) Date of Patent: Jan. 31, 2017

(54) DEVICE AND METHOD FOR IMPLEMENTING FAST FOURIER TRANSFORM/DISCRETE FOURIER TRANSFORM

(71) Applicant: ZTE Corporation, Shenzhen (CN)

(72) Inventor: Haiyong Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 143 days.

(21) Appl. No.: 14/422,620

(22) PCT Filed: Aug. 15, 2013

(86) PCT No.: PCT/CN2013/081545
§ 371 (c)(1),
(2) Date: Apr. 7, 2015

(87) PCT Pub. No.: WO2014/029293
PCT Pub. Date: Feb. 27, 2014

(65) Prior Publication Data
US 2015/0236881 A1 Aug. 20, 2015

(30) Foreign Application Priority Data
Aug. 22, 2012 (CN) .......................... 2012 1 0300484

(51) Int. Cl.
H04L 27/26 (2006.01)
(52) U.S. Cl.
CPC .................. H04L 27/265 (2013.01)
(58) Field of Classification Search
CPC .................................................. H04L 27/265
See application file for complete search history.

(56) References Cited

U.S. PATENT DOCUMENTS 4,501,149 A * 2/1985 Konno ................... G01N 29/14
                                                       702/39
5,694,347 A * 12/1997 Ireland .................. G06F 17/142
                                                       708/404

(Continued)

FOREIGN PATENT DOCUMENTS

CN    101277283 A    10/2008
CN    101571849 A    11/2009
CN    101937332 A     1/2011

OTHER PUBLICATIONS

International Search Report for corresponding application PCT/CN2013/081545 filed Aug. 15, 2013; Mail date Nov. 21, 2013.

*Primary Examiner* — Dung B Huynh
(74) *Attorney, Agent, or Firm* — Cantor Colburn LLP

(57) ABSTRACT

A device for implementing FFT/DFT is disclosed, comprising: a first multiplier, a second multiplier, a first adder, a second adder, a first multiplexer, a second multiplexer, a first accumulator register, a second accumulator register and a negation controller, wherein the first adder is configured to accumulate the output signals of the first multiplexer, the first multiplier and the second multiplier and input an accumulated signal to the first accumulator register; the second adder is configured to accumulate the output signals of the second multiplexer, the first multiplier and the second multiplier and input an accumulated signal to the second accumulator register; the first accumulator register is configured to output the output signal of the first adder or feed the same back to the first multiplexer; and the second accumulator register is configured to output the output signal of the second adder or feed the same back to the second multiplexer.

7 Claims, 7 Drawing Sheets

(56) References Cited

U.S. PATENT DOCUMENTS

| | | | | |
|---|---|---|---|---|
| 5,910,960 | A * | 6/1999 | Claydon | H03K 5/24 348/E5.108 |
| 5,951,677 | A * | 9/1999 | Wolf | G06F 9/30007 712/11 |
| 6,092,093 | A * | 7/2000 | Bayha | H04J 1/05 370/210 |
| 6,128,597 | A * | 10/2000 | Kolluru | G10L 19/0208 704/270 |
| 6,526,430 | B1 * | 2/2003 | Hung | G06F 7/544 375/E7.026 |
| 6,606,700 | B1 * | 8/2003 | Sih | G06F 7/4812 708/501 |
| 7,173,983 | B1 * | 2/2007 | Meyer | H04L 25/03159 370/203 |
| 7,814,137 | B1 * | 10/2010 | Mauer | H03H 17/0225 708/300 |
| 2001/0014166 | A1 * | 8/2001 | Hong | G06T 1/20 382/107 |
| 2002/0138716 | A1 * | 9/2002 | Master | G06F 15/7867 712/227 |
| 2002/0196880 | A1 * | 12/2002 | Koslov | H04L 27/2662 375/349 |
| 2004/0160346 | A1 * | 8/2004 | Husted | H04L 7/0029 341/61 |
| 2005/0131976 | A1 * | 6/2005 | Sunwoo | G06F 17/142 708/404 |
| 2008/0071848 | A1 | 3/2008 | Baireddy | |
| 2013/0066932 | A1 * | 3/2013 | Kwong | G06F 17/142 708/204 |

* cited by examiner

DEVICE AND METHOD FOR IMPLEMENTING FAST FOURIER TRANSFORM/DISCRETE FOURIER TRANSFORM

FIELD

The disclosure relates to the field of communications, including e.g., a device and method for implementing Fast Fourier Transformation/Discrete Fourier Transformation (FFT/DFT).

BACKGROUND

The FFT/DFT is widely applied to a communication system for processing a signal, including the communication system such as Long Term Evolution (LTE) involving in Orthogonal Frequency Division Multiplexing (OFDM), Worldwide Interoperability for Microwave Access (Wimax), China Mobile Multimedia Broadcasting (CMMB), Digital Video Broadcasting (DVB), Digital Audio Broadcast (DAB), Digital Subscriber Line (DSL) or the like.

For DFT, the DFT of finite length sequence x(n) with a length of N is computed by the following formula:

$$X(k) = DFT[x(n)] = \sum_{n=0}^{N-1} x(n) W_N^{nk} (k = 0, 1, \ldots N-1).$$

In general, x(n) is a sequence of complex number. For a k value, it is needed N complex multiplications and (N−1) complex additions to compute a x(k) value according to the above formula, so the amount for computing directly the DFT is positive proportional to the square of the length N of a transform interval. When N is large, too large amount of computation will result in too long computation time and will result in waste of software and hardware resources. Therefore, the FFT emerges in order to avoid the problem of big difficulty when the signal is processed in real time by using the DFT directly.

The FFT is a fast algorithm of the DFT, which may simplify the amount of computation of the DFT, and improves the operation speed. Since the coefficient $$W_N^{nk} = e^{-j\frac{2\pi}{N}nk}$$

is a periodic function and is of periodicity and symmetry. According to the symmetry of $W_N^{nk}$, it is obtained that $(W_N^{nk})^* = W_N^{-nk}$, $W_N^{k+n/2} = -W_N^k$, $W_N^{n(N+k)} = W_N^{k(N+n)} = W_N^{nk}$ and $W_N^{n(N-k)} = W_N^{k(N-n)} = W_N^{-nk}$. The operation of the DFT may be broken up into DFT operations of fewer points to the greatest extent by taking advantage of the periodicity and symmetry of $W_N^{nk}$.

At present, a traditional FFT/DFT may be computed by using a general-purpose operation unit or a special-purpose butterfly operation unit of some form. The traditional general-purpose operation unit may implement a real multiply operation, a real add operation, a real multiply-add operation, a real multiply-accumulate operation, a complex multiply operation, a complex add operation, a complex multiply-add operation, a complex multiply-accumulate operation and a radix 2 butterfly operation, but may not implement N-point high-order butterfly operation (N is a positive integer greater than 2). When the N-point high-order butterfly operation is performed, a relatively complicated special-purpose butterfly operation unit is usually adopted, for example the special-purpose butterfly operation unit which supports radix 3, radix 4 and radix 5 butterfly operations simultaneously may be adopted. However, the special-purpose butterfly operation unit of this type can only process the FFTs/DFTs of some fixed points after the special-purpose butterfly operation unit is designed. In a concrete application environment, the FFTs/DFTs of multiple fixed points may need to be computed. The special-purpose butterfly operation unit in the related art exits the problem of low flexibility, and at the same time, the special-purpose butterfly operation unit of this type often needs to consume more hardware resources and exits the problem of high complexity and power consumption. Thus, the operation speed is low when the signal is processed in real time, which is not conducive to the application of a mobile terminal.

SUMMARY

A device and method for implementing FFT/DFT are provided, by which the problem in the related art that a general-purpose operation unit cannot implement high-order butterfly operation and a special-purpose butterfly operation unit has low operation speed and flexibility is solved.

According to one aspect of the embodiments of the disclosure, a device for implementing FFT/DFT is provided, including: a first multiplier, a second multiplier, a first adder, a second adder, a first multiplexer, a second multiplexer, a first accumulator register, a second accumulator register and a negation controller configured to perform negation operation on the output signals of the first multiplier and/or the second multiplier, wherein an input end of the first adder is connected with an output end of the first multiplexer, an output end of the first multiplier and an output end of the second multiplier respectively, and an output end of the first is connected with an input end of the first accumulator register, and the first adder is configured to accumulate an output signal of the first multiplexer, an output signal of the first multiplier and an output signal of the second multiplier, and input an accumulated signals obtained to the first accumulator register; an input end of the second adder is connected with the output ends of the first multiplier, the output of the second multiplier and an output end of the second multiplexer respectively, and an output end of the second adder is connected with an input end of the second accumulator register, and the second adder is configured to accumulate an output signal of the second multiplexer, the output signal of the first multiplier and the output signal of the second multiplier, and input an accumulated signal obtained to the second accumulator register; and the first accumulator register is configured to output an output signal of the first adder or feed the output signal of the first adder back to an input end of the first multiplexer; and the second accumulator register is configured to output an output signal of the second adder or feed the output signal of the second adder back to an input end of the second multiplexer.

According to an embodiment of the disclosure, the negation controller includes a first negation controller, a second negation controller and a third negation controller, wherein one end of the first negation controller is connected with the output end of the first multiplier, and the other end of the first negation controller is connected with the input end of the second adder, and the first negation controller is configured to perform negation operation on a signal input by the first multiplier to the second adder when a trigger condition is received; one end of the second negation controller is connected with the output end of the second multiplier, and the other end of the second negation controller is connected with the input end of the first adder, and the second negation controller is configured to perform negation operation on a signal input by the second multiplier to the first adder when a trigger condition is received; and one end of the third negation controller is connected with the output end of the second multiplier, and the other end of the third negation controller is connected with the input end of the second adder, and the third negation controller is configured to perform negation operation on a signal input by the second multiplier to the second adder when a trigger condition is received.

According to an embodiment of the disclosure, the device further includes a third multiplexer and a fourth multiplexer, wherein two input ends of the third multiplexer are respectively connected with an output end used for outputting a zero signal and the output end of the second multiplier, and the third multiplexer is configured to input the zero signal or the output signal of the second multiplier to the first adder; and two input ends of the fourth multiplexer are respectively connected with an output end used for outputting a zero signal and the output end of the first multiplier, and the fourth multiplexer is configured to input the zero signal or the output signal of the first multiplier to the second adder.

According to an embodiment of the disclosure, the device further includes an instruction decoding unit, wherein the instruction decoding unit is configured to control the output signal of the first multiplexer, the output signal of the second multiplexer, an output signal of the third multiplexer and an output signal of the fourth multiplexer respectively, and trigger the negation controller when the negation operation is required for the output signal of the first multiplier and the output signal of the second multiplier.

According to another aspect of the embodiments of the disclosure, a method for performing N-point butterfly operation by the device for implementing FFT/DFT is provided, including that:

with respect to a first device for implementing FFT/DFT, the following steps are executed: an In-phase (I) signal of a first signal and an I signal of a second signal are respectively input to two input ends of the first multiplier, a Quadrature (Q) signal of the first signal and a Q signal of the second signal are respectively input to two input ends of the second multiplier, and an I signal of a third signal is input to a the multiplexer and the second multiplexer;

the first adder performs accumulation operation on an output signal of the first multiplexer, an output signal of the first multiplier and an output signal of the second multiplier processed by the negation controller, then the accumulated signal obtained is fed back to the first multiplexer via the first accumulator register, wherein the accumulated signal fed back by the first accumulator register is regarded by the first multiplexer as an updated output signal of the first multiplexer, and the accumulation operation is continuously performed on the updated output signal of the first multiplexer, the output signal of the first multiplier and the output signal of the second multiplier processed by the negation controller, until an output signal of the first multiplexer to be utilized at the time of performing accumulation operation is an accumulated signal fed back by the first accumulator register at the N−2th time, wherein N is a positive integer greater than 2;

an accumulated signal obtained by last accumulation operation of the first adder is regarded as a first path of I signal for the N-point butterfly operation; and accumulation operation is performed by the second adder on an output signal of the second multiplexer, the output signal of the first multiplier and the output signal of the second multiplier, then an accumulated signal obtained is fed back to the second multiplexer via the second accumulator register, wherein the accumulated signal fed back by the second accumulator register is regarded by the second multiplexer as an updated output signal of the second multiplexer, and the accumulation operation is continuously performed on the updated output signal of the second multiplexer, the output signal of the first multiplier and the output signal of the second multiplier, until an output signal of the second multiplexer to be utilized at the time of performing accumulation operation is an accumulated signal fed back by the second accumulator register at the N−2th time;

an accumulated signal obtained by last accumulation operation of the second adder is regarded as a second path of I signal for the N-point butterfly operation; and with respect to a second device for implementing FFT/DFT, the following steps are executed:

the I signal of the first signal and the Q signal of the second signal are respectively input to the two input ends of the first multiplier, the I signal of the second signal and the Q signal of the first signal are respectively input to the two input ends of the second multiplier, and a Q signal of the third signal is input to the first multiplexer and the second multiplexer;

accumulation operation is performed by the first adder on an output signal of the first multiplexer, an output signal of the first multiplier and an output signal of the second multiplier, then an accumulated signal obtained is fed back to the first multiplexer via the first accumulator register, wherein the accumulated signal fed back by the first accumulator register is regarded by the first multiplexer as an updated output signal of the first multiplexer, and the accumulation operation is continuously performed on the updated output signal of the first multiplexer, the output signal of the first multiplier and the output signal of the second multiplier, until an output signal of the first multiplexer to be utilized at the time of performing accumulation operation is an accumulated signal fed back by the first accumulator register at the N−2th time;

an accumulated signal obtained by last accumulation operation of the first adder is regarded as a first path of Q signal for the N-point butterfly operation;

accumulation operation is performed by the second adder on an output signal of the second multiplexer, the output signal of the first multiplier and the output signal of the second multiplier processed by the negation controller, then an accumulated signal obtained is fed back to the second multiplexer via the second accumulator register, wherein the accumulated signal fed back by the second accumulator register is regarded by the second multiplexer as an updated output signal of the second multiplexer, and the accumulation operation is continuously performed on the updated output signal of the second multiplexer, the output signal of the first multiplier and the output signal of the second multiplier processed by the negation controller, until an output signal of the second multiplexer to be utilized at the time of performing accumulation operation is an accumulated signal fed back by the second accumulator register at the N−2th time;

an accumulated signal obtained by last accumulation operation of the second adder is used as a second path of Q signal for the N-point butterfly operation; and the I signal obtained by the first adder of the first device for implementing FFT/DFT and the Q signal obtained by the first adder of the second device for implementing FFT/DFT are combined to obtain a first path of output signal for the N-point butterfly operation, and the I signal obtained by the second adder of the first device for implementing FFT/DFT and the Q signal obtained by the second adder of the second device for implementing FFT/DFT are combined to obtain a second path of output signal for the N-point butterfly operation.

According to the device and the method for implementing FFT/DFT provided by the embodiments of the disclosure, the device includes: a first multiplier, a second multiplier, a first adder, a second adder, a first multiplexer, a second multiplexer, a first accumulator register, a second accumulator register and a negation controller configured to perform negation operation on the output signal of the first multiplier and/or the output signal of the second multiplier, wherein the first adder is configured to accumulate the output signal of the first multiplexer, the output signal of the first multiplier and the output signal of the second multiplier and then input the accumulated signal to the first accumulator register; the second adder is configured to accumulate the output signal of the second multiplexer, the output signal of the first multiplier and the output signal of the second multiplier and then input the accumulated signal to the second accumulator register; the first accumulator register is configured to output the output signal of the first adder or feed the output signal of the first adder back to the first multiplexer; and the second accumulator register is configured to output the output signal of the second adder or feed the output signal of the second adder back to the second multiplexer. By the device according to the disclosure, two paths of signal outputs of a high-order butterfly operation can be obtained in one step, and the operation speed of the high-order butterfly operation is increased.

DETAILED DESCRIPTION OF THE EMBODIMENTS

The embodiments of the disclosure will be further described in conjunction with the accompanying drawings, but the disclosure is not limited to the following embodiments.

Embodiment I

Figure 1:
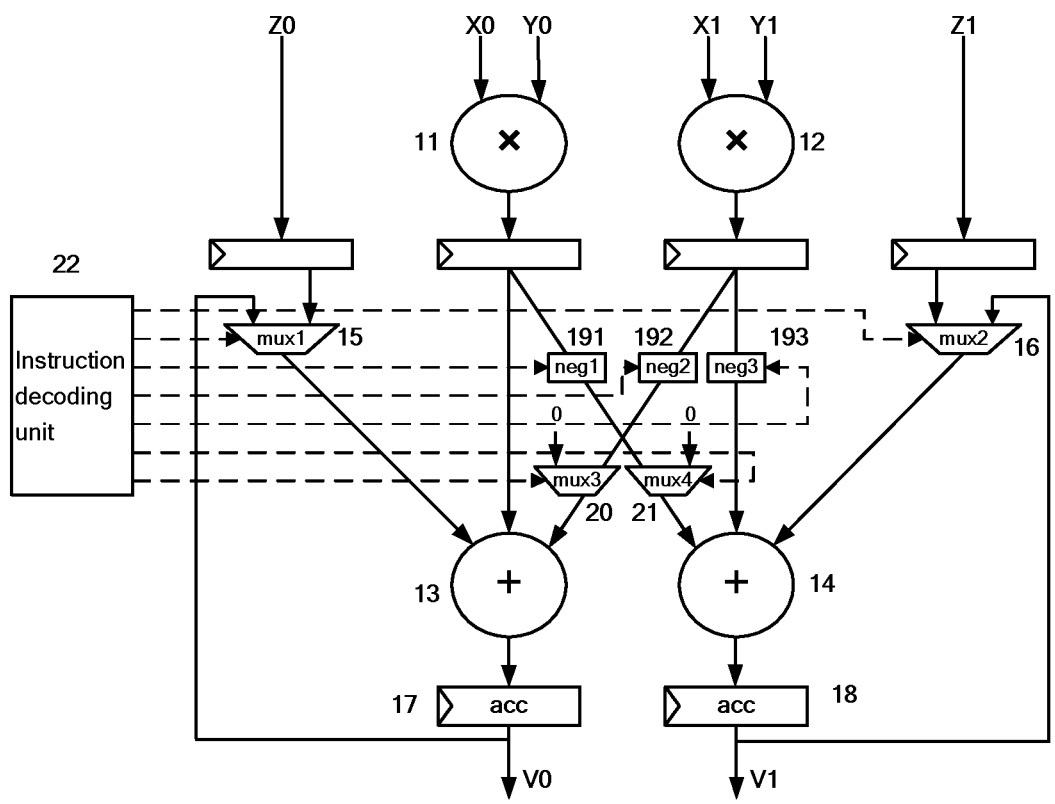
FIG. 1 is a structural diagram of a device for implementing FFT/DFT according to Embodiment I of the disclosure.

As shown in FIG. 1, FIG. 1 is a structural diagram of a device for implementing FFT/DFT according to Embodiment I of the disclosure. The device includes a first multiplier 11, a second multiplier 12, a first adder 13, a second adder 14, a first multiplexer 15 (mux1 as shown in FIG. 1), a second multiplexer 16 (mux2 as shown in FIG. 1), a first accumulator register 17, a second accumulator register 18 and a negation controller 19 configured to perform negation operation on the output signal of the first multiplier 11 and/or the output signal of the second multiplier 12, wherein an input end of the first adder 13 is connected with an output end of the first multiplexer 15, an output end of the first multiplier 11 and an output end of the second multiplier 12 respectively, and an output end of the first adder 13 is connected with an input end of the first accumulator register 17, and the first adder 13 is configured to accumulate an output signal of the first multiplexer 15, an output signal of the first multiplier 11 and an output signal of the second multiplier 12, and input an accumulated signal obtained to the first accumulator register 17;

an input end of the second adder 14 is connected with an output ends of the first multiplier 11, the output end of the second multiplier 12 and an output end of the second multiplexer 16 respectively, and an output end of the second adder 14 is connected with an input end of the second accumulator register 18, and the second adder 14 is configured to accumulate an output signal of the second multiplexer 16, the output signal of the first multiplier 11 and the output signal of the second multiplier 12, and input an accumulated signal obtained to the second accumulator register 18; and an input end of the first accumulator register 17 is connected with the output end of the first adder 13, and an output end of the first accumulator register 17 is connected with an output end of a first signal and one of the two input ends of the first multiplexer 15, and the first accumulator register 17 is configured to output an output signal of the first adder 13 or feed the output signal of the first adder 13 back to the input end of the first multiplexer 15; an input end of the second accumulator register 18 is connected with an output end of the second adder 14, and an output end of the second accumulator register 18 is connected with an output end of a second signal and one of the two input ends of the second multiplexer 16, and the second accumulator register 18 is configured to output an output signal of the second adder 14 or feed the output signal of the second adder 14 back to the input end of the second multiplexer 16.

According to an embodiment of the disclosure, the two input ends of the first multiplexer 15 are respectively connected with an input end of a first signal (the position where Z0 is located as shown in FIG. 1) and the output end of the first accumulator register 17, and the first multiplexer 15 is configured to receive an input signal from the input end of the first signal or an output signal fed back by the first accumulator register 17; the two input ends of the second multiplexer 16 are respectively connected with an input end of a second signal (the position where Z1 is located as shown in FIG. 1) and the output end of the second accumulator register 18, and the second multiplexer 16 is configured to receive an input signal from the input end of the second signal or the output signal fed back by the second accumulator register 18. Additionally, the two input ends of the first multiplier 11 are respectively connected with an input end of a third signal (the position where X0 is located as shown in FIG. 1) and an input end of a fourth signal (the position where Y0 is located as shown in FIG. 1), and the first multiplier 11 is configured to receive an input signal from the input end of the third signal and an input signal from the input end of the fourth signal, and perform multiplication operation on the input signal from the input end of the third signal and the input signal from the input end of the fourth signal; the two input ends of the second multiplier 12 are respectively connected with an input end of a fifth signal (the position where X1 is located as shown in FIG. 1) and an input end of a sixth signal (the position where Y1 is located as shown in FIG. 1), and the second multiplier 12 is configured to receive an input signal from the input end of the fifth signal and the input end of the sixth signal, and perform multiplication operation on the input signal from the input end of the fifth signal and the input end of the sixth signal.

According to an embodiment of the disclosure, the negation controller 19 includes a first negation controller 191 (neg1 as shown in FIG. 1), a second negation controller 192 (neg2 as shown in FIG. 1) and a third negation controller 193 (neg3 as shown in FIG. 1), wherein one end of the first negation controller 191 is connected with the output end of the first multiplier 11, and the other end of the first negation controller 191 is connected with the input end of the second adder 14, and the first negation controller 191 is configured to perform negation operation on a signal input by the first multiplier 11 to the second adder 14 when a trigger condition is received; one end of the second negation controller 192 is connected with the output end of the second multiplier 12, and the other end of the second negation controller 192 is connected with the input end of the first adder 13, and the second negation controller 192 is configured to perform negation operation on a signal input by the second multiplier 12 to the first adder 13 when a trigger condition is received; and one end of the third negation controller 193 is connected with the output end of the second multiplier 12, and the other end of the third negation controller 193 is connected with the input end of the second adder 14, and the third negation controller 193 is configured to perform negation operation on a signal input by the second multiplier 12 to the second adder 14 when a trigger condition is received.

According to an embodiment of the disclosure, the device further includes a third multiplexer 20 (mux3 as shown in FIG. 1) and a fourth multiplexer 21 (mux4 as shown in FIG. 1), wherein the two input ends of the third multiplexer 20 are respectively connected with an output end used for outputting a zero signal (signal "0" as shown in FIG. 1) and the output end of the second multiplier 12, and the third multiplexer 20 is configured to input the zero signal or the output signal of the second multiplier 12 to the first adder 13; and the two input ends of the fourth multiplexer 21 are respectively connected with an output end used for outputting a zero signal (signal "0" as shown in FIG. 1) and the output end of the first multiplier 11, and the fourth multiplexer 21 is configured to input the zero signal or the output signal of the first multiplier 11 to the second adder 14.

According to an embodiment of the disclosure, the device further includes an instruction decoding unit 22, wherein the instruction decoding unit 22 is configured to control the output signal of the first multiplexer 15, the output signal of the second multiplexer 16, an output signal of the third multiplexer 20 and an output signal of the fourth multiplexer 21 respectively (for example, one input signal of the two input signals input from the two input ends of the first multiplexer 15 to the first adder 13 by the first multiplexer 15 is controlled, one input signal of two input signals from the input ends of the third multiplexer 20 to the first adder 13 by the third multiplexer 20 is controlled, such as the zero signal or the output signal of the first multiplier 12), and trigger the negation controller 19 is triggered when the negation operation is required for the output signal of the first multiplier 11 and the second multiplier 12 (preferably, the first negation controller 191 when the negation operation is required for the signal input by the first multiplier 11 to the second adder 14, the second negation controller 192 is triggered when the negation operation is required for the signal input by the second multiplier 12 to the first adder 13 and trigger the third negation controller 193 when the negation operation is required for the signal input by the second multiplier 12 to the second adder 14).

According to an embodiment of the disclosure, by using the device of Embodiment I of the disclosure, the general operations such as 2 parallel real multiplies operations, real add operations, real multiply-add operations, real multiply-accumulate operations or the like can be completed simultaneously. For example, when the instruction decoding unit 22 controls the third multiplexer 20 and the fourth multiplexer 21 to respectively input all 0 data to the first adder 13 and the second adder 14, and controls the first multiplexer 15 and the second multiplexer 16 to respectively input all 0 data to the first adder 13 and the second adder 14, a product of input data of two input ends of the first multiplier 11 and a product of input data of two input ends of the second multiplier 12 can be obtained; alternatively, when the data input by one input end of the first multiplier 11 and the data input by one input end of the second multiplier 12 is respectively set to 1, and the third multiplexer 20 and the fourth multiplexer 21 are controlled to respectively input all 0 data to the first adder 13 and the second adder 14, the sum of non-one data input by the input end of the first multiplier 11 and the data input by the input end of the first signal, and the sum of non-one data input by the input end of the second multiplier 12 and the data input by the input end of the second signal can be obtained. Moreover, when only the third multiplexer 20 and the fourth multiplexer 21 are controlled to respectively input all 0 data to the first adder 13 and the second adder 14, the sum of the product of the input data of the two input ends of the first multiplier 11 and the data input by the first signal input end, and the sum of the product of the input data of the two input ends of the second multiplier 12 and the data input by the second signal input end can be implemented, that is, the multiply-add operation of the two reals may be implemented. Preferably, when the first multiplexer 15 and the second multiplexer 16 are controlled to respectively input the accumulated signals fed back by the first accumulator register 17 and the second accumulator register 18 to the first adder 13 and the second adder 14, the multiply-accumulate operation of the two reals may be implemented.

Figure 2:
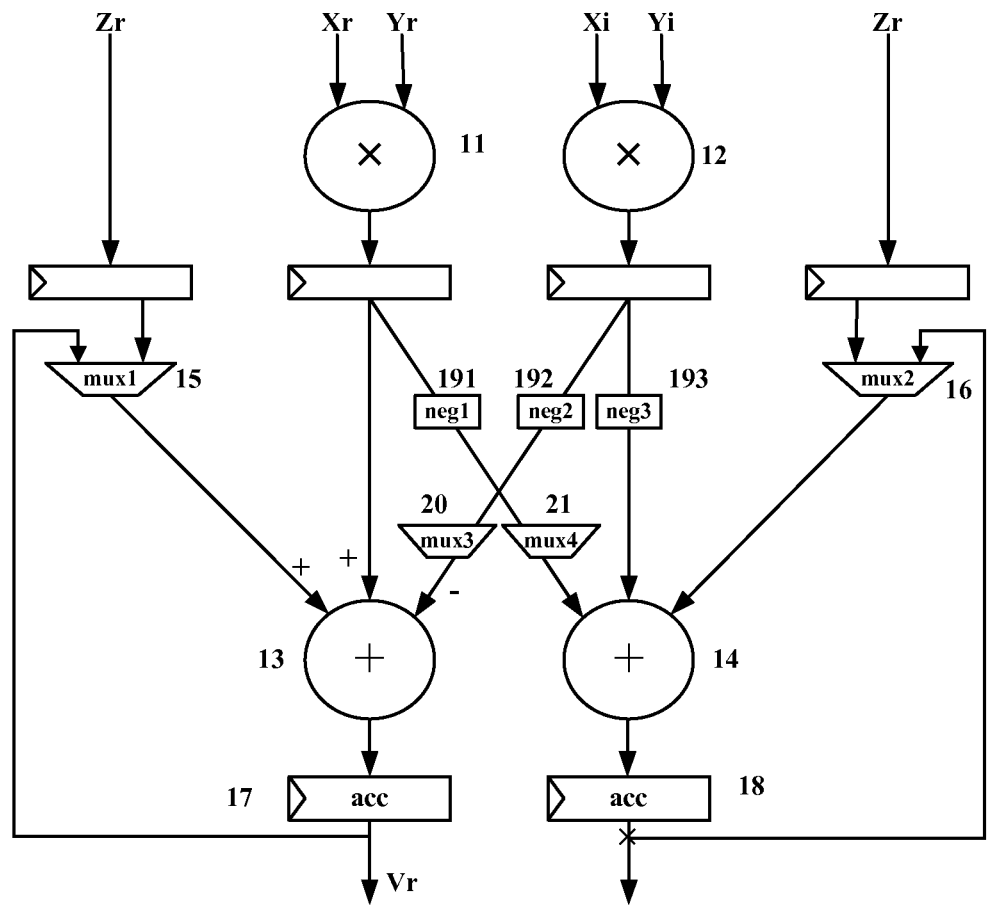
FIG. 2 is a structural diagram I in which a complex multiply-add operation is performed by using a device of Embodiment I according to Embodiment I of the disclosure.

According to an embodiment of the disclosure, the general operations such as complex multiply operation, complex add operation, complex multiply-add operation, complex multiply-accumulate operation or the like may be implemented in one step by using the two devices for implementing FFT/DFT of Embodiment I of the disclosure simultaneously. Preferably, FIG. 2 is a structural diagram I in which a complex multiply-add operation is performed by using a device of Embodiment I according to Embodiment I of the disclosure (specifically, FIG. 2 is a structural diagram of a computation of a real part when the complex multiply-add operation is performed).

According to an embodiment of the disclosure, the complex multiply-add operation is performed by using the device for implementing FFT/DFT according to a complex multiply-add computation formula as follows:

$$V = Vr + j*Vi = X*Y + Z = (Xr + j*Xi)*(Yr + j*Yi) + (Zr + j*Zi)$$

$$Vr = Xr*Yr - Xi*Yi + Zr$$

$Vi=Xr*Yi+Xi*Yr+Zi$

Preferably, according to the above formula, when the computation of the real part is performed during the complex multiply-add operation, as shown in FIG. 2, the I signal (Xr) of the first signal and the I signal (Yr) of the second signal are required to be input to the two input ends of the first multiplier 11, the Q signal (Xi) of the first signal and the Q signal (Yi) of the second signal are required to be input to the two input ends of the second multiplier 12, and the I signal (Zr) of the third signal is required to be input to the input end the first signal and the input end of the second signal. The instruction decoding unit 22 controls the third multiplexer 20 and the fourth multiplexer 21 to respectively input cross data to the first adder 13 and the second adder 14 (input the output signal of the first multiplier 12 to the first adder 13, and input the output signal of the first multiplier 11 to the second adder 14), while the negation controller 19 (the first negation controller 191) is triggered to perform negation operation on the output signal of the second multiplier 12, and then a real part signal (I signal) may be obtained after the complex multiply-add operation is performed on the first signal, the second signal and the third signal input. Specifically, the obtained I signal is the signal output by the first accumulator register 17.

Figure 3:
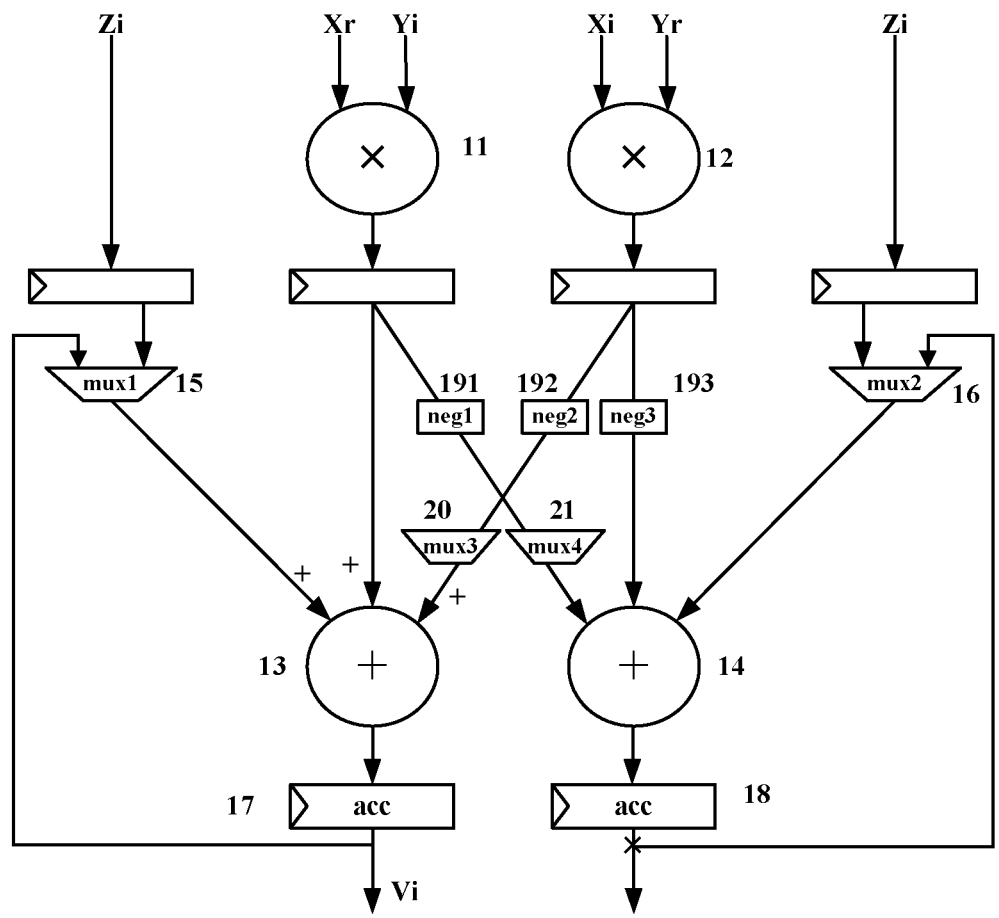
FIG. 3 is a structural diagram II in which a complex multiply-add operation is performed by using a device of Embodiment I according to Embodiment I of the disclosure.

Preferably, as shown in FIG. 3 (structural diagram II in which a complex multiply-add operation is performed by using a device of Embodiment I), when the computation of the imaginary part is performed during complex multiply-add operation, the I signal (Xr) of the first signal and the Q signal (Yi) of the second signal are required to be input to the two input ends of the first multiplier 11, the Q signal (Xi) of the first signal and the I signal (Yr) of the second signal are required to be input to the two input ends of the second multiplier 12, and the Q signal (Zi) of the third signal is required to be input to the input end of the first signal and the input end of the second signal. The instruction decoding unit 22 controls the third multiplexer 20 and the fourth multiplexer 21 to respectively input cross data to the first adder 13 and the second adder 14 (input the output signal of the first multiplier 12 to the first adder 13, and input the output signal of the first multiplier 11 to the second adder 14), and then an imaginary part signal (Q signal) may be obtained after the complex multiply-add operation is performed on the first signal, the second signal and the third signal input. Preferably, the obtained Q signal is the signal output by the first accumulator register 17.

According to an embodiment of the disclosure, the radix 2 butterfly operation may also be implemented in one step by using the two devices for implementing FFT/DFT of Embodiment I of the disclosure simultaneously. Preferably, the radix 2 butterfly operation is performed by using the device for implementing FFT/DFT according to a radix 2 butterfly operation computation formula as follows:

$V=Z+X*Y$ $U=Z-X*Y$

Preferably, the following formulas may be obtained by expanding the real part and imaginary part of V and U:

$Vr=Xr*Yr-Xi*Yi+Zr$ $Vi=Xr*Yi+Xi*Yr+Zi$ $Ur=-Xr*Yr+Xi*Yi+Zr$ $Ui=-Xr*Yi-Xi*Yr+Zi$

Figure 4:
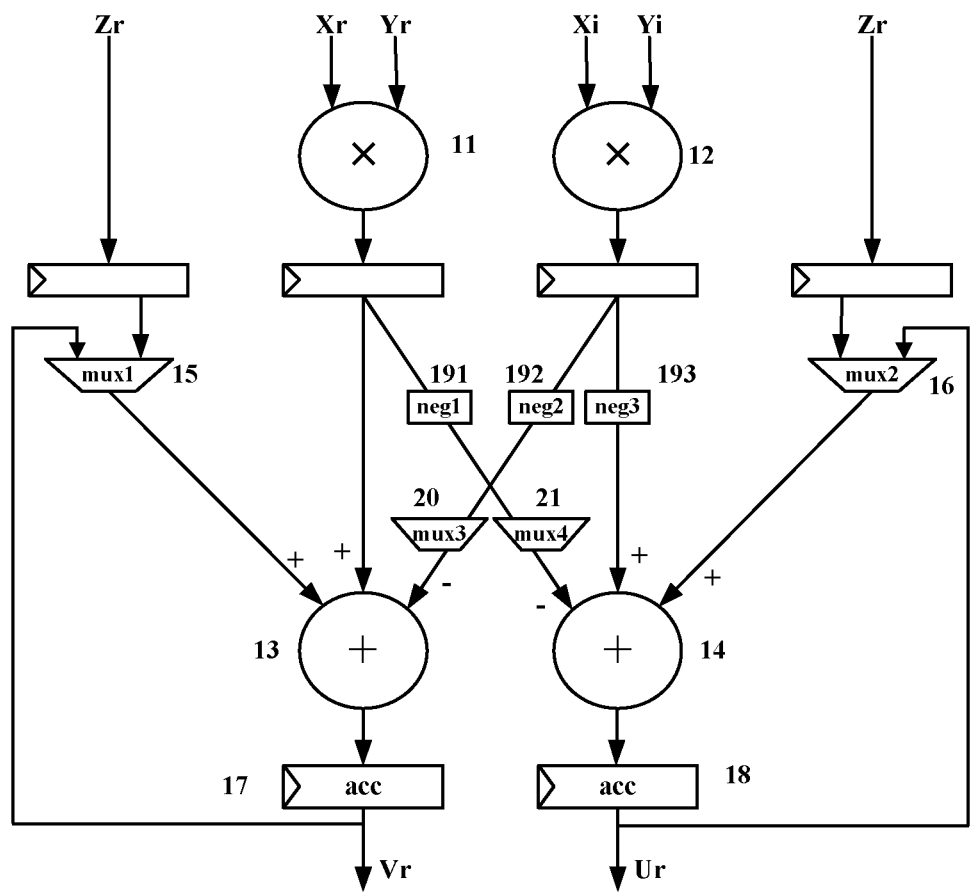
FIG. 4 is a structural diagram I in which a radix 2 butterfly operation is performed by using a device of Embodiment I according to Embodiment I of the disclosure.

Preferably, according to the above formula, when the computation of the real part is performed during radix 2 butterfly operation, as shown in FIG. 4, the I signal (Xr) of the first signal and the I signal (Yr) of the second signal are required to be input to the two input ends of the first multiplier 11, the Q signal (Xi) of the first signal and the Q signal (Yi) of the second signal are required to be input to the two input ends of the second multiplier 12, and the I signal (Zr) of the third signal is required to be input to the first signal input end and the second signal input end. The instruction decoding unit 22 controls the third multiplexer 20 and the fourth multiplexer 21 to respectively input cross data to the first adder 13 and the second adder 14 (input the output signal of the first multiplier 12 to the first adder 13, and input the output signal of the first multiplier 11 to the second adder 14), while the negation controller 19 (the first negation controller 191) is triggered to perform negation operation on the output signal of the second multiplier 12 and the negation controller 19 (the second negation controller 192) is triggered to perform negation operation on the output signal of the first multiplier 11, two paths of real part signals (I signal) may be obtained after a radix 2 superposition operation is performed on the first signal, the second signal and the third signal input. Preferably, the two paths of real part signals obtained are respectively the signal (Vr as shown in FIG. 4) output by the first accumulator register 17 and the signal (Ur as shown in FIG. 4) output by the second accumulator register 18.

Figure 5:
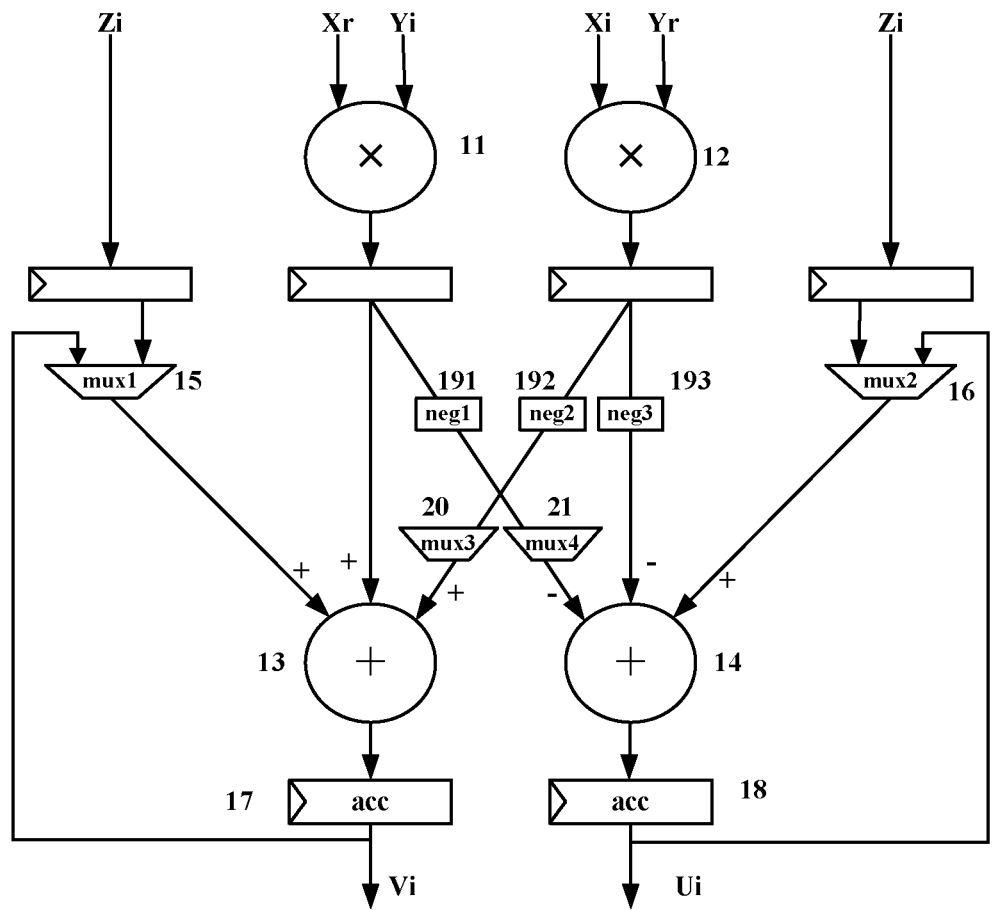
FIG. 5 is a structural diagram II in which a radix 2 butterfly operation is performed by using a device of Embodiment I according to Embodiment I of the disclosure.

According to an embodiment of the disclosure, as shown in FIG. 5 (structural diagram II in which a radix 2 butterfly operation is performed by using a device of Embodiment I), when the computation of the imaginary part is performed during the radix 2 butterfly operation, the I signal (Xr) of the first signal and the Q signal (Yi) of the second signal are required to be input to the two input ends of the first multiplier 11, the Q signal (Xi) of the first signal and the I signal (Yr) of the second signal are required to be input to the two input ends of the second multiplier 12, and the Q signal (Zi) of the third signal is required to be input to the input of the first signal end and the input end of the second signal. The instruction decoding unit 22 controls the third multiplexer 20 and the fourth multiplexer 21 to respectively input cross data to the first adder 13 and the second adder 14 (input the output signal of the first multiplier 12 to the first adder 13, and input the output signal of the first multiplier 11 to the second adder 14), while the negation controller 19 (the second negation controller 192) is triggered to perform negation operation on the output signal of the first multiplier 11 and the negation controller 19 (the third negation controller 193) is triggered to perform negation operation on the output signal of the second multiplier 12, two paths of imaginary part signals (Q signal) may be obtained after the complex multiply-add operation is performed on the first signal, the second signal and the third signal input. Preferably, the two paths of imaginary part signals obtained are respectively the signal (Vi as shown in FIG. 5) output by the first accumulator register 17 and the signal (Ui as shown in FIG. 5) output by the second accumulator register 18.

According to an embodiment of the disclosure, the output signal Vr of the first accumulator register 17 and the output signal Vi of the first accumulator register 17 are combined to obtain the V signal in the radix 2 butterfly operation. Likewise, the output signal Ur of the second accumulator register 18 and the output signal Ui of the second accumulator register 18 are combined to obtain the U signal in the radix 2 butterfly operation.

Preferably, N-point butterfly operation may also be implemented in one step by using the two devices for implementing FFT/DFT of Embodiment I of the disclosure simultaneously. Preferably, the N-point butterfly operation is performed by using the device for implementing FFT/DFT according to an N-point butterfly operation computation formula as follows:

$$\begin{bmatrix} y_0 \\ y_1 \\ y_2 \\ \dots \\ y_{N-2} \\ y_{N-1} \end{bmatrix} = \begin{bmatrix} W^0 & W^0 & W^0 & \dots & W^0 & W^0 \\ W^0 & W^1 & W^2 & \dots & W^{N-2} & W^{N-1} \\ W^0 & W^2 & W^4 & \dots & W^{2*(N-2)} & W^{2*(N-1)} \\ \dots & \dots & \dots & \dots & \dots & \dots \\ W^0 & W^{N-2} & W^{(N-2)*2} & \dots & W^{(N-2)*(N-2)} & W^{(N-2)*(N-1)} \\ W^0 & W^{N-1} & W^{(N-1)*2} & \dots & W^{(N-1)*(N-2)} & W^{(N-1)*(N-1)} \end{bmatrix}$$

$$\begin{bmatrix} x_0 \\ w_1 x_1 \\ w_2 x_2 \\ \dots \\ w_{N-2} x_{N-2} \\ w_{N-1} x_{N-1} \end{bmatrix}$$

$$= \begin{bmatrix} W^0 & W^0 & W^0 & \dots & W^0 & W^0 \\ W^0 & W^1 & W^2 & \dots & W^{N-2} & W^{N-1} \\ W^0 & W^2 & W^4 & \dots & W^{2*(N-2)} & W^{2*(N-1)} \\ \dots & \dots & \dots & \dots & \dots & \dots \\ W^0 & \overline{W}^2 & \overline{W}^4 & \dots & \overline{W}^{2*(N-2)} & \overline{W}^{2*(N-1)} \\ W^0 & \overline{W}^1 & \overline{W}^2 & \dots & \overline{W}^{N-2} & \overline{W}^{N-1} \end{bmatrix} \begin{bmatrix} z_0 \\ z_1 \\ z_2 \\ \dots \\ z_{N-2} \\ z_{N-1} \end{bmatrix}$$

Preferably, the following formulas may be obtained by simplifying the above formulas:

$$y_1 = W^0 z_0 + W^1 z_1 + W^2 z_2 + \dots + W^{N-2} z_{N-2} + W^{N-1} z_{N-1}$$

$$y_{N-1} = W^0 z_0 + \overline{W}^1 z_1 + \overline{W}^2 z_2 + \dots + \overline{W}^{N-2} z_{N-2} + \overline{W}^{N-1} z_{N-1}$$

$$y_2 = W^0 z_0 + W^2 z_1 + W^4 z_2 + \dots + W^{2*(N-2)} z_{N-2} + W^{2*(N-1)} z_{N-1}$$

$$y_{N-2} = W^0 z_0 + \overline{W}^2 z_1 + \overline{W}^4 z_2 + \dots + \overline{W}^{2*(N-2)} z_{N-2} + \overline{W}^{2*(N-1)} z_{N-1}$$

Preferably, the formulas of ditn and ditn_acc as shown below may be obtained according to the formulas, the two paths of output signals during the N-point butterfly operation are computed by accumulating one time ditn and multiplies ditn_acc, and the ditn and the ditn_acc may be expressed as follows:

$$ditn: V = Z + X*Y$$

$$U = Z + \overline{X}*Y$$

$$ditn\_acc: V = acc + X*Y$$

$$U = acc + \overline{X}*Y$$

The following formulas may be obtained by expanding the real part and imaginary part of the ditn and the ditn_acc:

$$ditn: Vr = Xr*Yr - Xi*Yi + Zr$$

$$Vi = Xr*Yi + Xi*Yr + Zi$$

$$Ur = Xr*Yr + Xi*Yi + Zr$$

$$Ui = Xr*Yi - Xi*Yr + Zi$$

$$ditn\_acc: Vr = Xr*Yr - Xi*Yi + accr$$

$$Vi = Xr*Yi + Xi*Yr + acci$$

$$Ur = Xr*Yr + Xi*Yi + accr$$

$$Ui = Xr*Yi - Xi*Yr + acci$$

Figure 6:
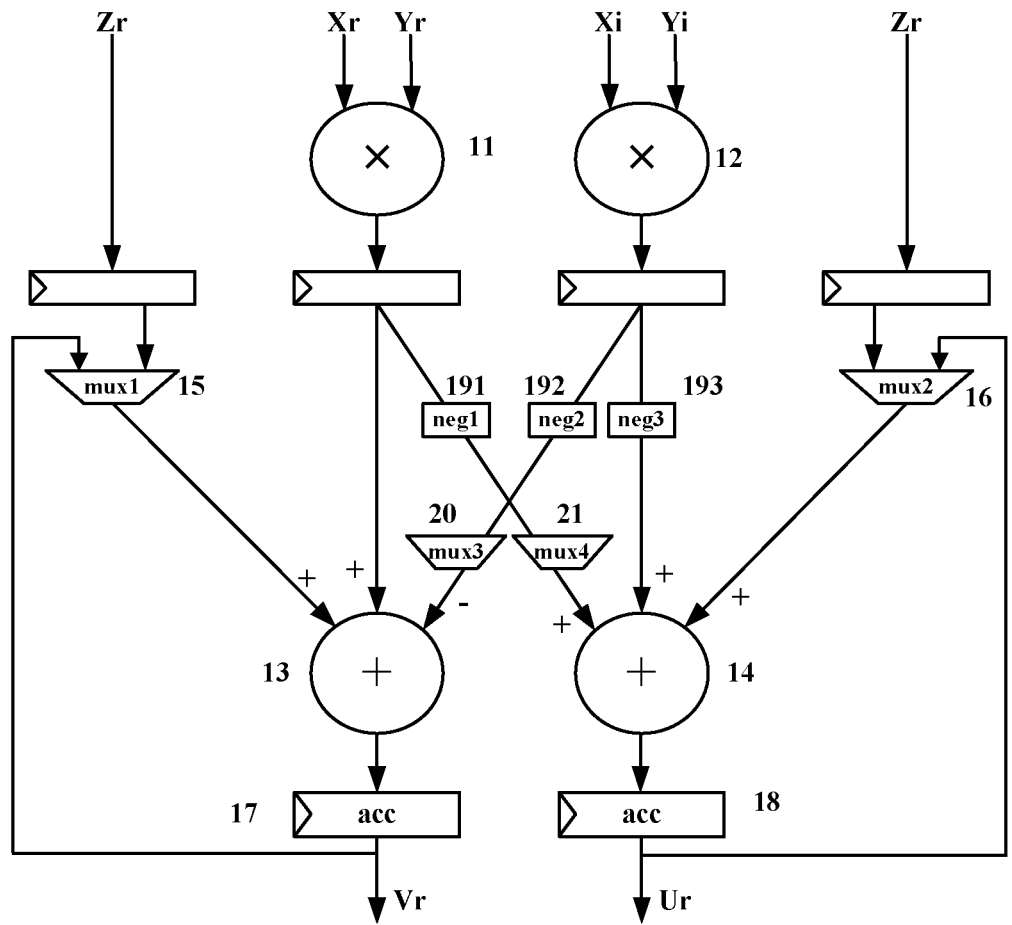
FIG. 6 is a structural diagram I in which an N-point butterfly operation is performed by using a device of Embodiment I according to Embodiment I of the disclosure.

Preferably, the above ditn formula may be implemented as follows: as shown in FIG. 6, the I signal (Xr) of the first signal and the I signal (Yr) of the second signal are input to the two input ends of the first multiplier 11, the Q signal (Xi) of the first signal and the Q signal (Yi) of the second signal are input to the two input ends of the second multiplier 12, and the I signal (Zr) of the third signal is input to the input end of the first signal and the input end of the second signal. The instruction decoding unit 22 controls the third multiplexer 20 and the fourth multiplexer 21 to respectively input cross data to the first adder 13 and the second adder 14 (input the output signal of the first multiplier 12 to the first adder 13, and input the output signal of the first multiplier 11 to the second adder 14), while the negation controller 19 (the first negation controller 191) is triggered to perform negation operation on the output signal of the second multiplier 12, and then two paths of real part signals (I signal) of the ditn may be obtained. Preferably, the two paths of real part signals obtained are respectively the signal (Vr as shown in FIG. 6) output by the first accumulator register 17 and the signal (Ur as shown in FIG. 6) output by the second accumulator register 18.

Figure 7:
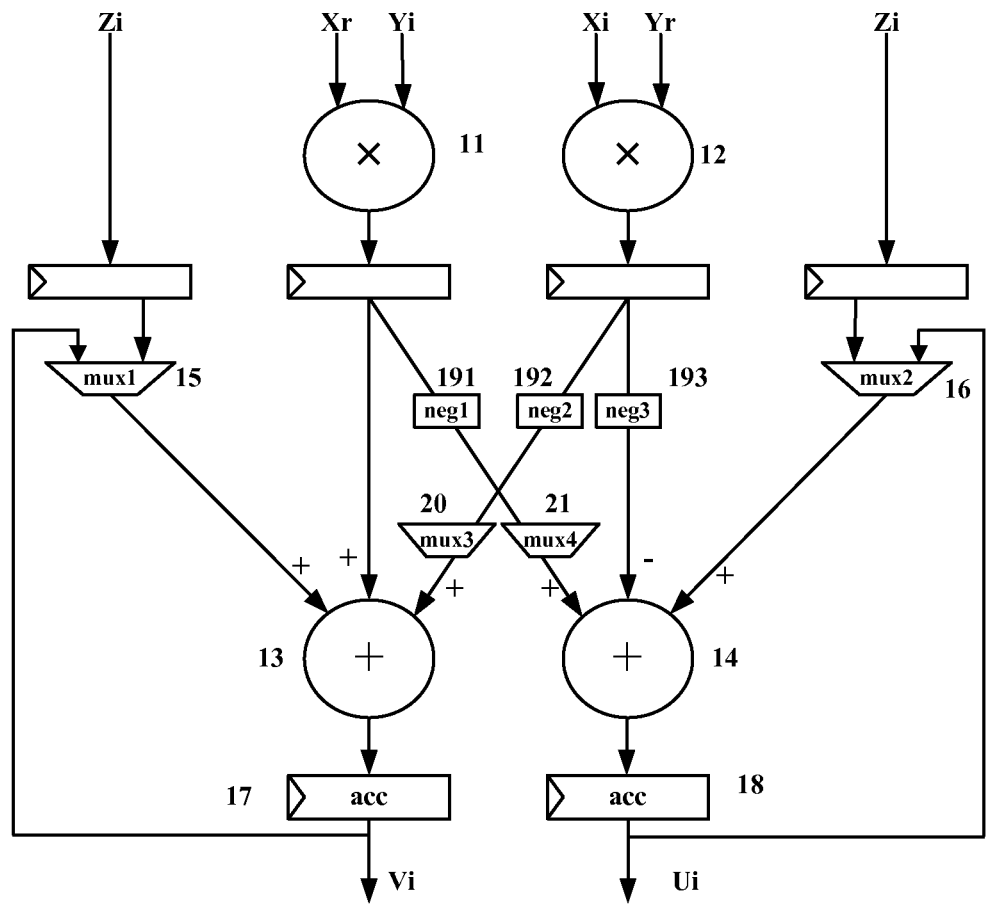
FIG. 7 is a structural diagram II in which an N-point butterfly operation is performed by using a device of Embodiment I according to Embodiment I of the disclosure.

Preferably, as shown in FIG. 7, the I signal (Xr) of the first signal and the Q signal (Yi) of the second signal are input to the two input ends of the first multiplier 11, the Q signal (Xi) of the first signal and the I signal (Yr) of the second signal are input to the two input ends of the second multiplier 12, and the Q signal (Zi) of the third signal is input to the input end of the first signal and the input end of the second signal. The instruction decoding unit 22 controls the third multiplexer 20 and the fourth multiplexer 21 to respectively input cross data to the first adder 13 and the second adder 14 (input the output signal of the second multiplier 12 to the first adder 13, and input the output signal of the first multiplier 11 to the second adder 14), while the negation controller 19 (the third negation controller 193) is triggered to perform negation operation on the output signal of the second multiplier 12, and then two paths of imaginary part signals (Q signal) of the ditn may be obtained. Preferably, the two paths of imaginary part signals obtained are respectively the signal (Vi as shown in FIG. 7) output by the first accumulator register 17 and the signal (Ui as shown in FIG. 7) output by the second accumulator register 18.

Preferably, the ditn_acc formula may be implemented as follows: as shown in FIG. 6, the I signal (Xr) of the first signal and the I signal (Yr) of the second signal are input to the two input ends of the first multiplier 11, the Q signal (Xi) of the first signal and the Q signal (Yi) of the second signal are input to the two input ends of the second multiplier 12, and the I signal (Zr) of the third signal is input to the input end of the first signal and the input end of the second signal. The instruction decoding unit 22 controls the third multiplexer 20 and the fourth multiplexer 21 to respectively input cross data to the first adder 13 and the second adder 14 (input the output signal of the second multiplier 12 to the first adder 13, and input the output signal of the first multiplier 11 to the second adder 14), and controls the first multiplexer 15 and the second multiplexer 16 to respectively input the accumulated signals fed back by the first accumulator register 17 and the second accumulator register 18 to the first adder 13 and the second adder 14, while the negation controller 19 (the first negation controller 191) is triggered to perform negation operation on the output signal of the second multiplier 12, and then two paths of real part signals (I signal) of the ditn_acc may be obtained. Preferably, the two paths of real part signals obtained are respectively the signal (Vr as shown in FIG. 6) output by the first accumulator register 17 and the signal (Ur as shown in FIG. 6) output by the second accumulator register 18.

Preferably, as shown in FIG. 7, the I signal (Xi) of the first signal and the Q signal (Yi) of the second signal are input to the two input ends of the first multiplier 11, the Q signal (Xi) of the first signal and the I signal (Yr) of the second signal are input to the two input ends of the second multiplier 12, and the Q signal (Zi) of the third signal is input to the input end of the first signal and the input end of the second signal. The instruction decoding unit 22 controls the third multiplexer 20 and the fourth multiplexer 21 to respectively input cross data to the first adder 13 and the second adder 14 (input the output signal of the second multiplier 12 to the first adder 13, and input the output signal of the first multiplier 11 to the second adder 14), and controls the first multiplexer 15 and the second multiplexer 16 to respectively input the accumulated signals fed back by the first accumulator register 17 and the second accumulator register 18 to the first adder 13 and the second adder 14, while the negation controller 19 (the third negation controller 193) is triggered to perform negation operation on the output signal of the second multiplier 12, and then two paths of imaginary part signals (Q signal) of the ditn_acc may be obtained. Preferably, the two paths of imaginary part signals obtained are respectively the signal (Vi as shown in FIG. 7) output by the first accumulator register 17 and the signal (Ui as shown in FIG. 7) output by the second accumulator register 18.

Preferably, y1 and yN−1 may be computed by ditn of one time and ditn_acc of N−2 times simultaneously, and y2, yN−2 and y3 and yN−3 may be computed similarly.

A device for implementing FFT-DFT is provided in the embodiment I of the disclosure. The device includes: a first multiplier, a second multiplier, a first adder, a second adder, a first multiplexer, a second multiplexer, a first accumulator register, a second accumulator register and a negation controller configured to perform negation operation on the output signals of the first multiplier and/or the second multiplier, wherein the first adder is configured to accumulate the output signal of the first multiplexer, the output signal of the first multiplier and the output signal of the second multiplier, and then input an accumulated signal to the first accumulator register; the second adder is configured to accumulate the output signal of the second multiplexer, the output signal of the first multiplier and the output signal of the second multiplier, and then input an accumulated signal to the second accumulator register; the first accumulator register is configured to output the output signal of the first adder or feed the output signal of the first adder back to the first multiplexer; and the second accumulator register is configured to output the output signal of the second adder or feed the output signal of the second adder back to the second multiplexer. By the device of the disclosure, general operations such as 2 parallel real multiplies operation, real add operation, real multiply-add operation, real multiply-accumulate operation or the like can be completed simultaneously, or general operations such as one-time complex multiply operation, complex add operation, complex multiply-add operation, and complex multiply-accumulate operation or the like can be implemented by using the two devices for implementing FFT/DFT of Embodiment I of the disclosure, and the two paths of outputs of the radix 2 butterfly operation or the two paths of outputs of the N-point butterfly operation may be computed in one step simultaneously by using the device for implementing FFT/DFT of Embodiment I of the disclosure. On the basis of meeting the generation operation, the operation speed of the radix 2 butterfly operation or N-point high-order butterfly operation is improved greatly (N is a positive integer greater 2), which is applicable to a computing unit such as a DSP, a vector processor or the like.

Embodiment II

A method for performing N-point butterfly operation by the device for implementing FFT/DFT of Embodiment I is provided in the embodiment II of the disclosure (the two devices for implementing FFT/DFT of Embodiment I is required in the method), including the following steps.

Step I: With respect to the first device for implementing FFT/DFT (the first device), an I signal of a first signal and an I signal of a second signal are respectively input to the two input ends of a first multiplier of the first device, a Q signal of the first signal and a Q signal of the second signal are respectively input to the two input ends of a second multiplier, and the I signal of a third signal is input to a first multiplexer and a second multiplexer.

Preferably, by taking FIG. 6 as an example, in the Step I, the I signal (Xr) of the first signal and the I signal (Yr) of the second signal are required to be input to the two input ends of the first multiplier 11, the Q signal (Xi) of the first signal and the Q signal (Yi) of the second signal are required to be input to the two input ends of the second multiplier 12, and the I signal (Zr) of the third signal is required to be input to the input end of the first signal and the input end of the second signal.

Step II: With respect to the first device, the following operations are executed: the accumulation operation is performed by a first adder on an output signal of the first multiplexer, an output signal of the first multiplier and an output signal of the second multiplier processed by the negation controller and then an accumulated signal obtained is fed back to the first multiplexer via the first accumulator register, the accumulated signal fed back by the first accumulator register is used as an updated output signal of the first multiplexer by the first multiplexer, and the accumulation operation is continuously performed on the updated output signal of the first multiplexer, the output signal of the first multiplier and the output signal of the second multiplier processed by the negation controller until an output signal of the first multiplexer to be utilized at the time of performing accumulation operation is an accumulated signal fed back by the first accumulator register at the N−2th time, wherein N is a positive integer greater 2; the accumulation operation is performed by a second adder on an output signal of the second multiplier, the output signal of the first multiplier and the output signal of the second multiplier and then an accumulated signal obtained is fed back to the second multiplexer via the second accumulator register, the accumulated signal fed back by the second accumulator register is used as an updated output signal of the second multiplexer by the second multiplexer, and the accumulation operation is continuously performed on the updated output signal of the second multiplexer, the output signal of the first multiplier and the output signal of the second multiplier until an output signal of the second multiplexer to be utilized at the time of performing accumulation operation is an accumulated signal fed back by the second accumulator register at the N−2th time.

Preferably, by taking FIG. 6 as an example, in the Step II, the instruction decoding unit 22 is required to control the third multiplexer 20 and the fourth multiplexer 21 to respectively input the cross data to the first adder 13 and the second adder 14 (the output signal of the second multiplier 12 is input to the first adder 13, and the output signal of the first multiplier 11 is input to the second adder 14), and control the first multiplexer 15 and the second multiplexer 16 to respectively input the accumulated signal fed back by the first accumulator register 17 and the accumulated signal fed back by the second accumulator register 18 to the first adder 13 and the second adder 14, while the negation controller 19 (the first negation controller 191) is triggered to perform negation operation on the output signal of the second multiplier 12.

Step III: The accumulated signal obtained by the last accumulation operation of the first adder of the first device is used as a first path of I signal at N-point butterfly operation, and the accumulated signal obtained by the last accumulation operation of the second adder of the first device is used as a second path of I signal at N-point butterfly operation.

Preferably, by taking FIG. 6 as an example, the first path of I signal obtained in the Step III is the signal (Vr as shown in FIG. 6) output by the first accumulator register 17, and the second path of I signal obtained in the Step III is the signal (Ur as shown in FIG. 6) output by the second accumulator register 18.

Step IV: With respect to the second device for implementing FFT/DFT (the second device), the I signal of the first signal and the Q signal of the second signal are respectively input to the two input ends of the first multiplier of the second device, the I signal of the second signal and the Q signal of the first signal are respectively input to the two input ends of the second multiplier of the second device, and the Q signal of the third signal is input to the first multiplexer and the second multiplexer of the second device.

Preferably, by taking FIG. 7 as an example, in the Step IV, the I signal (Xr) of the first signal and the Q signal (Yi) of the second signal are required to be input to the two input ends of the first multiplier 11, the Q signal (Xi) of the first signal and the I signal (Yr) of the second signal are required to be input to the two input ends of the second multiplier 12, and the Q signal (Zi) of the third signal is required to be input to the input end of the first signal and the input end of the second signal.

Step V: With respect to the second device, the following operations are executed: the accumulation operation is performed by the first adder on an output signal of the first multiplexer, an output signal of the first multiplier and an output signal of the second multiplier and then an accumulated signal obtained is fed back to the first multiplexer via the first accumulator register, the accumulated signal fed back by the first accumulator register is used as an updated output signal of the first multiplexer by the first multiplexer, and the accumulation operation is continuously performed on the updated output signal of the first multiplexer, the output signal of the first multiplier and the output signal of the second multiplier until an output signal of the first multiplexer to be utilized at the time of performing accumulation operation is an accumulated signal fed back by the first accumulator register at the N−2th time; the accumulation operation is performed by the second adder on an output signal of the second multiplexer, the output signal of the first multiplier and the output signal of the second multiplier processed by the negation controller and then an accumulated signal obtained is fed back to the second multiplexer via the second accumulator register, the accumulated signal fed back by the second accumulator register is used as an updated output signal of the second multiplexer by the second multiplexer, and the accumulation operation is continuously performed on the updated output signal of the second multiplexer, the output signal of the first multiplier and the output signal of the second multiplier processed by the negation controller until an output signal of the second multiplexer to be utilized at the time of performing accumulation operation is an accumulated signal fed back by the second accumulator register at the N−2th time;

Preferably, by taking FIG. 7 as an example, in the Step V, the instruction decoding unit 22 is required to control the third multiplexer 20 and the fourth multiplexer 21 to respectively input the cross data to the first adder 13 and the second adder 14 (the output signal of the second multiplier 12 is input to the first adder 13, and the output signal of the first multiplier 11 is input to the second adder 14), and control the first multiplexer 15 and the second multiplexer 16 to respectively input the accumulated signal fed back by the first accumulator register 17 and the accumulated signal fed back by the second accumulator register 18 to the first adder 13 and the second adder 14, while the negation controller 19 (the third negation controller 193) is triggered to perform negation operation on the output signal of the second multiplier 12.

Step VI: The accumulated signal obtained by the last accumulation operation of the first adder of the second device is used as a first path of Q signal at N-point butterfly operation, and the accumulated signal obtained by the last accumulation operation of the second adder of the second device is used as a second path of Q signal at N-point butterfly operation.

Preferably, the first path of Q signal obtained is the signal (Vi as shown in FIG. 7) output by the first accumulator register 17, the second path of Q signal obtained is the signal (Ui as shown in FIG. 7) output by the second accumulator register 18.

Step VII: The I signal obtained by the first adder of the first device and the Q signal obtained by the first adder of the second device are combined to obtain the first path of output signal for the N-point butterfly operation, and the I signal obtained by the second adder of the first device and the Q signal obtained by the second adder of the second device are combined to obtain the second path of output signal for the N-point butterfly operation.

It should be noted that, Step I to Step III and Step IV to Step VI may be performed simultaneously. When Step I to Step III and Step IV to Step VI are performed simultaneously, the two devices for implementing FFT/DFT of Embodiment I of the disclosure are required to be used simultaneously, such as the first device and the second device of Embodiment II of the disclosure.

Preferably, a method for performing radix 2 butterfly operation by the device for implementing FFT/DFT of Embodiment I is further provided in the embodiment II of the disclosure (the method also requires using the two devices for implementing FFT/DFT of Embodiment I), including the following steps.

Step I: With respect to the first device for implementing FFT/DFT, an I signal of a first signal and an I signal of a second signal are respectively input to the two input ends of a first multiplier of the device, a Q signal of the first signal and a Q signal of the second signal are respectively input to the two input ends of a second multiplier of the device, and the I signal of a third signal is input to a first multiplexer and a second multiplexer.

Preferably, by taking FIG. 4 as an example, in the Step I, the I signal (Xr) of the first signal and the I signal (Yr) of the second signal are required to be input to the two input ends of the first multiplier 11, the Q signal (Xi) of the first signal and the Q signal (Yi) of the second signal are required to be input to the two input ends of the second multiplier 12, and the I signal (Zr) of the third signal is required to be input to the input end of the first signal and the input end of the second signal.

Step II: With respect to the first device for implementing FFT/DFT, the following operations are executed: the accumulation operation is performed by a first adder on the output signal of the first multiplexer, the output signal of the first multiplier and the output signal of the second multiplier processed by the negation controller, an accumulated signal obtained is used as the first path of real part signal obtained after a radix 2 superposition operation is performed on the first signal, the second signal and the third signal input; the accumulation operation is performed by a second adder on the output signal of the second multiplexer, the output signal of the first multiplier and the output signal of the second multiplier processed by the negation controller, the accumulated signal obtained is used as the second path of real part signal obtained after a radix 2 superposition operation is performed on the first signal, the second signal and the third signal input.

Preferably, by taking FIG. 4 as an example, in the Step II, the instruction decoding unit 22 is required to control the third multiplexer 20 and the fourth multiplexer 21 to respectively input the cross data to the first adder 13 and the second adder 14 (the output signal of the second multiplier 12 is input to the first adder 13, and the output signal of the first multiplier 11 is input to the second adder 14), while the negation controller 19 (the first negation controller 191) is triggered to perform negation operation on the output signal of the second multiplier 12 and the negation controller 19 (the second negation controller 192) is triggered to perform negation operation on the output signal of the first multiplier 11.

Preferably, the first path of real part signal obtained is the signal (Vr as shown in FIG. 4) output by the first accumulator register 17, and the second path of real part signal obtained is the signal (Ur as shown in FIG. 4) output by the second accumulator register 18.

Step III: With respect to the second device for implementing FFT/DFT, the I signal of the first signal and the Q signal of the second signal are respectively input to the two input ends of the first multiplier of the device, the I signal of the second signal and the Q signal of the first signal are respectively input to the two input ends of the second multiplier of the device, and the Q signal of the third signal is input to the first multiplexer and the second multiplexer of the second device.

Preferably, by taking FIG. 5 as an example, in the Step III, the I signal (Xr) of the first signal and the Q signal (Yi) of the second signal are required to be input to the two input ends of the first multiplier 11, the Q signal (Xi) of the first signal and the I signal (Yr) of the second signal are required to be input to the two input ends of the second multiplier 12, and the Q signal (Zi) of the third signal is required to be input to the first signal input end and the second signal input end.

Step IV: With respect to the second device for implementing FFT/DFT, the following operations are executed: the accumulation operation is performed by the first adder on the output signal of the first multiplexer, the output signal of the first multiplier and the output signal of the second multiplier, and the accumulated signal obtained is used as the first path of imaginary part signal obtained after a complex multiply-add operation is performed on the first signal, the second signal and the third signal input; the accumulation operation is performed by a second adder on the output signal of the second multiplexer, the output signal of the first multiplier and the output signal of the second multiplier processed by a negation controller, and the accumulated signal obtained is used as the second path of imaginary part signal obtained after a complex multiply-add operation is performed on the first signal, the second signal and the third signal input.

Preferably, by taking FIG. 5 as an example, in the Step IV, the instruction decoding unit 22 is required to control the third multiplexer 20 and the fourth multiplexer 21 to respectively input the cross data to the first adder 13 and the second adder 14 (the output signal of the second multiplier 12 is input to the first adder 13, and the output signal of the first multiplier 11 is input to the second adder 14), while the negation controller 19 (the second negation controller 192) is triggered to perform negation operation on the output signal of the first multiplier 11 and the negation controller 19 (the third negation controller 193) is triggered to perform negation operation on the output signal of the second multiplier 12.

Preferably, the first path of imaginary part signal obtained is the signal (Vi as shown in FIG. 5) output by the first accumulator register 17, and the second path of imaginary part signal obtained is the signal (Ui as shown in FIG. 5) output by the second accumulator register 18.

Step V: The I signal obtained by the first adder of the first device for implementing FFT/DFT and the Q signal obtained by the first adder of the second device for implementing FFT/DFT are combined to obtain the first path of output signal for the radix 2 butterfly operation, and the I signal obtained by the second adder of the first device for implementing FFT/DFT and the Q signal obtained by the second adder of the second device for implementing FFT/DFT are combined to obtain the second path of output signal for radix 2 butterfly operation.

It should be noted that, Step I to Step II and Step III to Step IV may be performed simultaneously. When Step I to Step II and Step III to Step IV are performed simultaneously, the two devices for implementing FFT/DFT of Embodiment I of the disclosure are required to be used simultaneously, such as the first device for implementing FFT/DFT and the second device for implementing FFT/DFT of Embodiment II of the disclosure.

Preferably, a method for performing general operations such as complex multiply operation, complex add operation, complex multiply-add operation and complex multiply-accumulator operation or the like by the device for implementing FFT/DFT of Embodiment I is further provided in the embodiment II of the disclosure, and a method for performing general operations such as real multiply operation, real add operation, real multiply-add operation and real multiply-accumulator operation or the like by the device for implementing FFT/DFT of Embodiment I (specifically refer to detailed description of Embodiment I of the disclosure). Those methods are not repeated in Embodiment II of the disclosure.

Obviously, those skilled in the art may change and modify the disclosure without departing from the spirit and scope of the disclosure. In this way, if these changes and modifications of the disclosure fall within the scope of the claims of the disclosure and equivalent technology thereof, the disclosure is also intended to encompass these changes and modifications.

What is claimed is:

1. A device for implementing Fast Fourier Transformation/Discrete Fourier Transformation (FFT/DFT), comprising: a first multiplier, a second multiplier, a first adder, a second adder, a first multiplexer, a second multiplexer, a first accumulator register, a second accumulator register and a negation controller configured to perform negation operation on output signal of the first multiplier and/or the second multiplier, wherein an input end of the first adder is connected with an output end of the first multiplexer, an output end of the first multiplier and an output end of the second multiplier respectively, an output end of the first adder is connected with an input end of the first accumulator register, and the first adder is configured to accumulate an output signal of the first multiplexer, an output signal of the first multiplier and an output signal of the second multiplier, and input an accumulated signal obtained to the first accumulator register;

an input end of the second adder is connected with the output end of the first multiplier, the output end of the second multiplier and an output end of the second multiplexer respectively, an output end of the second adder is connected with an input end of the second accumulator register, and the second adder is configured to accumulate an output signal of the second multiplexer, the output signal of the first multiplier and the output signal of the second multiplier, and input an accumulated signal obtained to the second accumulator register; and the first accumulator register is configured to output an output signal of the first adder or feed the output signal of the first adder back to an input end of the first multiplexer; and the second accumulator register is configured to output an output signal of the second adder or feed the output signal of the second adder back to an input end of the second multiplexer.

2. The device according to claim 1, wherein the negation controller comprises a first negation controller, a second negation controller and a third negation controller, wherein one end of the first negation controller is connected with the output end of the first multiplier, and the other end of the first negation controller is connected with the input end of the second adder, and the first negation controller is configured to perform negation operation on a signal input by the first multiplier to the second adder when a trigger condition is received;

one end of the second negation controller is connected with the output end of the second multiplier, and the other end of the second negation controller is connected with the input end of the first adder, and the second negation controller is configured to perform negation operation on a signal input by the second multiplier to the first adder when a trigger condition is received; and one end of the third negation controller is connected with the output end of the second multiplier, and the other end of the third negation controller is connected with the input end of the second adder, and the third negation controller is configured to perform negation operation on a signal input by the second multiplier to the second adder when a trigger condition is received.

3. The device according to claim 1, further comprising a third multiplexer and a fourth multiplexer, wherein two input ends of the third multiplexer are respectively connected with an output end used for outputting a zero signal and the output end of the second multiplier, and the third multiplexer is configured to input the zero signal or the output signal of the second multiplier to the first adder; and two input ends of the fourth multiplexer are respectively connected with an output end used for outputting a zero signal and the output end of the first multiplier, and the fourth multiplexer is configured to input the zero signal or the output signal of the first multiplier to the second adder.

4. The device according to claim 3, further comprising an instruction decoding unit, wherein the instruction decoding unit is configured to control the output signal of the first multiplexer, the output signal of the second multiplexer, an output signal of the third multiplexer and an output signal of the fourth multiplexer respectively, and trigger the negation controller when the negation operation is required for the output signal of the first multiplier and the output signal of the second multiplier.

5. A method for performing N-point butterfly operation by the device for implementing FFT/DFT according to claim 1, comprising:

with respect to a first device for implementing FFT/DFT, executing following steps:

respectively inputting an In-phase (I) signal of a first signal and an I signal of a second signal to two input ends of the first multiplier, respectively inputting a Quadrature (Q) signal of the first signal and a Q signal of the second signal to two input ends of the second multiplier, and inputting an I signal of a third signal to the first multiplexer and the second multiplexer;

performing, by the first adder, accumulation operation on an output signal of the first multiplexer, an output signal of the first multiplier and an output signal of the second multiplier processed by the negation controller, then feeding an accumulated signal obtained back to the first multiplexer via the first accumulator register, wherein the accumulated signal fed back by the first accumulator register is regarded by the first multiplexer as an updated output signal of the first multiplexer, and continuously performing the accumulation operation on the updated output signal of the first multiplexer, the output signal of the first multiplier and the output signal of the second multiplier processed by the negation controller, until an output signal of the first multiplexer to be utilized at the time of performing accumulation operation is an accumulated signal fed back by the first accumulator register at the N−2th time, wherein N is a positive integer greater than 2;

using an accumulated signal obtained by last accumulation operation of the first adder as a first path of I signal for the N-point butterfly operation;

performing, by the second adder, accumulation operation on an output signal of the second multiplexer, the output signal of the first multiplier and the output signal of the second multiplier, then feeding an accumulated signal obtained back to the second multiplexer via the second accumulator register, wherein the accumulated signal fed back by the second accumulator register is regarded by the second multiplexer as an updated output signal of the second multiplexer, and continuously performing the accumulation operation on the updated output signal of the second multiplexer, the output signal of the first multiplier and the output signal of the second multiplier, until an output signal of the second multiplexer to be utilized at the time of performing accumulation operation is an accumulated signal fed back by the second accumulator register at the N−2th time;

using an accumulated signal obtained by last accumulation operation of the second adder as a second path of I signal for the N-point butterfly operation;

with respect to a second device for implementing FFT/DFT, executing following steps:

respectively inputting the I signal of the first signal and the Q signal of the second signal to the two input ends of the first multiplier, respectively inputting the I signal of the second signal and the Q signal of the first signal to the two input ends of the second multiplier, and inputting a Q signal of the third signal to the first multiplexer and the second multiplexer;

performing, by the first adder, accumulation operation on an output signal of the first multiplexer, an output signal of the first multiplier and an output signal of the second multiplier, then feeding an accumulated signal obtained back to the first multiplexer via the first accumulator register, wherein the accumulated signal fed back by the first accumulator register is regarded by the first multiplexer as an updated output signal of the first multiplexer, and continuously performing the accumulation operation on the updated output signal of the first multiplexer, the output signal of the first multiplier and the output signal of the second multiplier, until an output signal of the first multiplexer to be utilized at the time of performing accumulation operation is an accumulated signal fed back by the first accumulator register at the N−2th time;

using an accumulated signal obtained by last accumulation operation of the first adder as a first path of Q signal for the N-point butterfly operation;

performing, by the second adder, accumulation operation on an output signal of the second multiplexer, the output signal of the first multiplier and the output signal of the second multiplier processed by the negation controller, then feeding an accumulated signal obtained back to the second multiplexer via the second accumulator register, wherein the accumulated signal fed back by the second accumulator register is regarded by the second multiplexer as an updated output signal of the second multiplexer, and continuously performing the accumulation operation on the updated output signal of the second multiplexer, the output signal of the first multiplier and the output signal of the second multiplier processed by the negation controller, until an output signal of the second multiplexer to be utilized at the time of performing accumulation operation is an accumulated signal fed back by the second accumulator register at the N−2th time;

using an accumulated signal obtained by last accumulation operation of the second adder as a second path of Q signal for the N-point butterfly operation; and combining the I signal obtained by the first adder of the first device for implementing FFT/DFT and the Q signal obtained by the first adder of the second device for implementing FFT/DFT to obtain a first path of output signal for the N-point butterfly operation, and combining the I signal obtained by the second adder of the first device for implementing FFT/DFT and the Q signal obtained by the second adder of the second device for implementing FFT/DFT to obtain a second path of output signal for the N-point butterfly operation.

6. The device according to claim 2, further comprising a third multiplexer and a fourth multiplexer, wherein
two input ends of the third multiplexer are respectively connected with an output end used for outputting a zero signal and the output end of the second multiplier, and the third multiplexer is configured to input the zero signal or the output signal of the second multiplier to the first adder; and
two input ends of the fourth multiplexer are respectively connected with an output end used for outputting a zero signal and the output end of the first multiplier, and the fourth multiplexer is configured to input the zero signal or the output signal of the first multiplier to the second adder.

7. The device according to claim 6, further comprising an instruction decoding unit, wherein
the instruction decoding unit is configured to control the output signal of the first multiplexer, the output signal of the second multiplexer, an output signal of the third multiplexer and an output signal of the fourth multiplexer respectively, and trigger the negation controller when the negation operation is required for the output signal of the first multiplier and the output signal of the second multiplier.

* * * * *